United States Patent [19]

Gardiner

[11] 4,026,867

[45] May 31, 1977

[54] ACID MODIFIED PHENOL-ALDEHYDE RESINOUS CONDENSATION PRODUCTS AND FRICTION PARTICLES THEREFROM

[75] Inventor: Robert A. Gardiner, Maplewood, Minn.

[73] Assignee: Minnesota Mining and Manufacturing Company, St. Paul, Minn.

[22] Filed: Apr. 16, 1976

[21] Appl. No.: 677,700

Related U.S. Application Data

[63] Continuation-in-part of Ser. No. 523,824, Nov. 14, 1974, abandoned.

[52] U.S. Cl. .............................. 260/46; 51/298 A; 260/51 R; 260/53 R; 260/54; 260/32.4; 260/38; 260/844
[51] Int. Cl.$^2$ .......................................... C08G 8/18
[58] Field of Search ............. 260/46, 53 R, 54, 51 R

[56] References Cited

UNITED STATES PATENTS

| | | | |
|---|---|---|---|
| 2,114,121 | 4/1938 | Bender | 260/53 |
| 2,506,904 | 5/1950 | Smith et al. | 260/53 X |
| 3,020,254 | 2/1962 | Less et al. | 260/53 X |
| 3,624,038 | 11/1971 | Weidner | 260/53 |

FOREIGN PATENTS OR APPLICATIONS 46-3476  1/1971  Japan

OTHER PUBLICATIONS

Kirk—Othmer, Encyclopedia of Chemical Technology, vol. 12, p. 826, vol. 14, p. 331.
J. American Chem. Soc. 60, 2495–7 (1938), Ipatieff et al.

Primary Examiner—Howard E. Schain
Attorney, Agent, or Firm—Cruzan Alexander; Donald M. Sell; Temple Clayton

[57] ABSTRACT

Friction modifying particles are formed from acid modified phenol-aldehyde resins and the polyvalent metal salts thereof.

7 Claims, No Drawings

ACID MODIFIED PHENOL-ALDEHYDE RESINOUS CONDENSATION PRODUCTS AND FRICTION PARTICLES THEREFROM

This application is a continuation-in-part of application Ser. No. 523,824, filed Nov. 14, 1974, and now abandoned.

This invention relates to phenolic resins useful for the manufacture of friction modifying particles, as a binder and saturating resin, suitably for use in disc brakes for vehicles. This invention more particularly relates to friction modifying particles providing high coefficients of friction at elevated temperatures.

Decreasing or arresting the motion of vehicles has conventionally been by brakes which convert the energy of motion or momentum into heat energy. For this purpose, friction pads have been employed for many years. They consist essentially of asbestos, either in the form of woven fabric or discrete particles, and a thermosetting phenolic resin, either in liquid or particulate form, formed and cured under heat and pressure to a stable structure. The phenolic resin may be an unmodified phenol-formaldehyde resin, or one modified by inclusion of substituted phenols or thermosetting oils. Although resins formed from phenol offered higher friction at elevated temperatures, brake pads including only such resins wear rapidly at elevated temperatures and tend to be noisy in operation. Modification of the phenolic gives quieter, smoother operation, but the coefficient of friction tends to decrease rapidly at elevated temperatures. These friction characteristics are conventionally altered by inclusion of inorganic particles, such as barium sulfate, iron oxide, metallic particles, and, in the most preferred constructions by the addition of cured substituted phenolic "friction modifying particles" in amount to form a substantial fraction of the volume of the brake pad. The friction modifying particles result in a satisfactory stabilization of the coefficient of friction over a wide range of temperatures; the substituted phenolic base used softens at elevated temperatures without exuding a liquid and so modifies the wear.

Until recently, brake lining manufacturers have been able to formulate friction pads by proper choice of components that give satisfactory operation over all ranges of speeds and weights used by modern automobiles. Replacement of the conventional brake band by the disc pad has changed the problems. The disc brake generates much higher temperatures at its surface because of its configuration and because it contacts a rotating disc instead of the integral brake drum of the earlier construction. Because of the smaller braking surface, generally higher pressures are required in use. Instead of operating temperatures of up to perhaps 425° C. for the brakes of passenger cars, surface temperatures of 525° C. and even higher are frequently encountered in the disc brake. At these temperatures, the friction modifying particles no longer provide a satisfactory coefficient of friction and it is no longer possible to obtain the balance of good friction and moderate wear that was previously attained. Disc pads generally are made either with friction modifying particles, which provide a smooth operating silent pad with good wear and low friction at elevated temperatures or without friction modifying particles and tolerating a noisy pad with high wear for good high temperature values of the coefficient of friction.

It is an object of this invention to provide resins for friction modifying particles for use in disc brake pads. A further object of the invention is to provide disc brake pads having a balance of performance with respect to wear and noise and coefficient of friction over both normal temperature ranges and over high temperature ranges. Other objects will become evident hereinelsewhere.

In accordance with the above and other objects of the invention, it has been found that valuable new and novel friction modifying particles are obtained by crushing a fully cured cross-linked phenol-aldehyde condensate in which the phenol contains acidic substituents either on the ring or attached to side chains.

Suitable aldehyde components are generally available and conventional for such purposes, e.g., furfural, acetaldehyde or formaldehyde. Formaldehyde is preferred, used either as such or in the form of one of the well-known compositions which liberate formaldehyde under condensation conditions, e.g., formalin (an aqueous solution of formaldehyde), paraform (an oligomer of formaldehyde), hexamethylenetetramine (a thermolabile condensate of formaldehyde and ammonia), etc. Mixtures of aldehydes are sometimes useful.

Improvement in the high temperature performance of brake pads over those using previously known particles is based upon the presence in the phenolic resin of acidic functional groups which can be converted to salts. Suitable acidic functional groups include —$SO_3H$, —$PO(OH)_2$ and —$CO_2H$. These may be bonded to a carbon atom of the phenolic nucleus or pendant from a carbon atom of the side chain.

One convenient method of obtaining suitable materials is by the reaction of ethylenically unsaturated substituted phenols such as those of cashew nut shell liquid, with one or more alpha-beta-unsaturated aliphatic carboxylic acids or acid derivatives to form an adduct. This reaction, knwon as the "ene" reaction or semi-Diels-Alder reaction (Kirk-Othmer 14, 331 (1964)), takes place readily, either as a result of photochemical activation or more generally, at moderately elevated temperatures.

The unsaturated phenol may be a single compound or, usually, a mixture of compounds comprising mononuclear substituted phenols wherein the aromatic benzene ring contains one or two phenolic hydroxyl groups, preferably one. If two hydroxyl groups are present, they are generally in meta relationship to each other. The major phenolic component preferably also contains three hydrogen atoms in ortho or para relationship to hydroxyl and an ethylenically unsaturated hydrocarbylene radical of 5 to 36 carbon atoms, and preferably 6–20 carbon atoms. The hydrocarbylene contains one or more carbon-carbon double bonds, each separated from the aromatic benzene ring by at least two carbon atoms. The hydrocarbylene radical is situated meta to hydroxyl. The preferred phenols thus are represented by the structure:

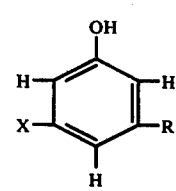

I wherein X is H or OH and R is an ethylenically unsaturated hydrocarbylene of 5–36 carbon atoms in which the double bonds are non-conjugated.

The products obtained from the above unsaturated phenols of Formula I by means of the ene reaction referred to hereinabove are monomeric meta-(carboxy alkenyl)-substituted phenols of the formula:

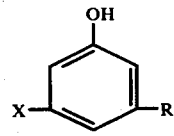

wherein R is a carboxy alkenyl group containing at least one ethylenic double bond of the formula: $-C_nH_{2n-x}(CO_2M)_m$ where $x$ is an integer from 2 to 11 inclusive, $x-m=y$, $m$ is an integer from 1 to $y+1$, $y$ is 1, 3 or 5, $n$ is 5 to 38, $x$ is odd when $m$ is even and even when $m$ is odd, M is H or one equivalent of a polyvalent metal (that is, $z(M)$ is an atom of valence $z$) and X is H or OH; and low polymers of said phenols. In the case of low polymers or oligomers, which are actually self-condensation products, it will be seen that such materials are available when the ene reaction is carried out, for example, on bodied cashew nut shell liquid in which oligomers of the simpler phenols are present, e.g. U.S. Pat. No. 2,128,427. The preferred substituted phenols of Formula II have a side-chain R in which $n$ is 17–21 as will become evident herebelow.

The presence of three hydrogen atoms ortho or para to hydroxyl allows the reaction with aldehyde to form highly crosslinked, solvent-resistant resins. The level of crosslinking of the phenol-aldehyde polymer, and hence the hardness, solvent resistance and high temperature stability of the fully cured resin, can be increased, for example, by including phenol or m-cresol (i.e., phenol without hydrocarbyl chain of 2 or more carbon atoms) to the extent of 5 – 40 mole percent or more of the phenolic mixture. The presence of low polymers of phenols of Formula II also leads to higher level of cross-linking and usually requires lower amounts of aldehyde to reach a given level of crosslinking.

Suitable ethylenically unsaturated phenols can be prepared by a variety of conventional procedures. A convenient and economical source is the naturally occurring material which makes up the liquid within the interstices of the cashew nut shell.

Cashew nut shell liquid (CNSL) is a naturally occurring material in which a benzene ring bears one or two hydroxyl groups, a carboxyl group, and in the meta position relative to the hydroxyl group or groups, an unsaturated 15 carbon atom hydrocarbylene group. The hydrocarbylene radical may contain one, two or three double bonds in unconjugated relationship; on the average, the chain contains about two double bonds. It is presently believed that the 15-carbon side chain may contain a single double bond at the 8–9 position of two or three bonds at the 8–9 and 11–12, or 8–9, 11–12 and 14–15 positions. The carboxyl group is normally lost during recovery of oil from the shell and early processing.

In addition to the predominant monophenol, 3-pentadecenyl phenol, generally referred to as "cardanol", there is a significant amount of dihydroxy derivative and additionally a wide range of inorganic impurities, chiefly alkali and alkali metal salts. Although the crude liquid can be and frequently is used for making cured phenolics suitable, for example, for making friction modifying particles, various purification and isolation procedures are preferred for making high-quality products with consistent properties. Such procedures are available, for example, according to U.S. Pat. Nos. 2,098,824, 2,128,247 and 2,559,593.

Suitable acidic reactants include the well-known "dienophiles" of the Diels-Alder reaction, e.g., acrylic acid, ethyl methacrylate, acrylonitrile, maleic acid, maleic anhydride, fumaric acid, itaconic acid, etc. Preferred acidic reactants are dienophilic alpha-beta-unsaturated carboxylic acids and anhydrides and esters thereof.

Reaction of one mole or less of, for example, acrylic ester, with a monoolefinic phenol provides a useful product. A product capable of even better high temperature performance is obtained by reaction of a polyunsaturated hydrocarbylene-substituted phenol with more than one molar equivalent of acid derivative, to give a polycarboxylic unsaturated hydrocarbylene phenol. A preferred mode is to react a polycarboxylic compound, e.g., fumaric acid, maleic anhydride or acid with a mono- or polyunsaturated phenol such as a mixture comprising cashew nut shell liquid in crude or purified form. Adducts of this type have been used heretofore in solution for tanning leather (Yamada, Japanese Patent Publication 3476 of 1971) but have not been employed for condensation with aldehydes. Suitable polycarboxylic unsaturated hydrocarbylene phenols can contain as little as 0.5% or as much as about 35% by weight of carboxyl radical. Generally, if the dienophile is not initially in acid form, it is converted to the free acid during or after the addition reaction, for example, by hydrolysis.

The carboxylic or polycarboxylic unsaturated hydrocarbylene phenol or acid radical-containing phenol is reacted with an aldehyde by conventional means generally using more than one mole of aldehyde per phenolic nucleus for final cure. An excess of aldehyde can be removed by volatilization during the curing of the polymer, but usually less than two moles of aldehyde are added and less than 1.5 moles per phenolic nucleus react. Products produced containing about one mole or less of aldehyde per nucleus tend to be soft and relatively soluble. Such resins are suitable, for example, as "saturating resins" mixed, neat or in common solvents, first with a latent aldehyde, such as hexamethylene tetramine, then with asbestos and conventional fillers and finally cured under heat and pressure. Such novolak resins, particularly those containing unsubstituted phenol can be ground, if necessary, at a reduced temperature, blended with filler, molded and cured under heat and pressure to form compositions which provide high coefficients of friction as binding matrix or friction particles or both. Those containing about 1.5 are highly crosslinked, insoluble, and infusible. If the phenol comprises a polyphenol, as from a "bodied" cashew nut shell component, one mole per nucleus provides an adequately crosslinked structure and as little as one quarter mole can be used to provide a useful novolak. Such polyphenols are oligomers of the above simple phenols in which two or more molecules are condensed and which can contain an average (q) of more than one such molecule, i.e., of Formula I.

The free acid form of the resin provides improved performance in brake pads over a carboxyl group-free resin, but even greater improvement in performance of brake pads is obtained when the resin is converted to the salt of a polyvalent, particularly di- or trivalent, metal, such as calcium, zinc, aluminum, etc. The ionic linkage between acid group and polyvalent metal appears to act as an "ionic crosslink" to provide improved high temperature characteristics. Alkaline earth cations, e.g. calcium, barium or strontium, are preferred. Conversion is conveniently effected by neutralization of the substituted phenol by agitation with base such as calcium oxide or barium hydroxide prior to the addition of aldehyde. Suitably, the carboxy-containing phenol mixture is blended with the aldehyde in heavy duty mixing equipment, poured into shallow pans and heated at 100°-300° C. for 10-24 hours. The resulting resin is then broken into chunks and ground to a coarse powder of about 0.2 to 0.8 mm. diameter for use as friction modifying particles. Alternatively, the free or neutralized acid-group containing phenol, blended with aldehyde, may be formed by inclusion of, for example, air or any conventional blowing agent, prior to or during cure, to produce a product suitable for use as a cationic ion-exchange resin.

For testing, both laboratory evaluation and actual automobile operation are used. The laboratory evaluation is in essential conformance with Brake Lining Quality Control Test Procedure — SAE J661a as described in the 1970 SAE Handbook, P. 892 published by the Society of Automotive Engineers, New York, New York.

The test consists of pressing a 2.5 cm. × 2.5 cm. × 0.6 cm. pad of cured product, prepared as described below, at controlled pressures and temperature, against the surface of a 27 cm. diameter brake drum rotating at constant speed of 417 rpm. The frictional force is continuously recorded and loss in weight of the specimen during the test determined.

While each of the measurements made during the test is significant in determining the desirability of the friction compositions, adequate evaluation of the friction modifying particle component can be obtained by comparison of (1) the maximum temperature reached during the second fade sequence, (2) the final coefficient of friction in the second fade sequence, and (3) weight loss during test. The 2nd fade sequence is terminated by either of (a) 20 minutes running time, (b) decrease in coefficient of friction below 0.2, (c) wearing of pad below clips, and (d) temperature reaching 420° C. It should be realized that maintenance of high friction at elevated temperature implies excessive wear under these test conditions and that evaluation of wear characteristics as they pertain to operating conditions must be obtained from other tests. The laboratory formulation selected is simplified to remove variables other than the friction particle and is not suitable for normal use.

Car tests are performed substantially in accordance with Part 571, Title 49, Code of Federal Regulations, Motor Vehicle Safety Standard No. 105a, as published in the (U.S.) Federal Register 37 No. 172, Sept. 2, 1972.

EXAMPLE 1

To a 3 liter, 3-necked round bottom flask equipped with a mechanical stirrer, thermometer and a condenser connected through a Dean-Stark trap is charged 424 g. (1.4 moles) acid washed cashew nut shell liquid as described in U.S. Pat. No. 2,559,593, Example 8, and 80 g. of toluene. In a separate container, 138 g. (1.4 moles) of maleic anhydride is dissolved in 117 g. of water by heating to 60° C. The water-maleic anhydride solution is poured into the 3-liter flask with the toluene and CNSL and the resulting mixture is heated to reflux and water is removed in the Dean-Stark trap. When the water has all been removed, the toluene is removed by further distillation to a flask temperature of about 130° C. At this point, the Dean-Stark trap is removed and the flask equipped with a long condenser having both water and air cooling. The temperature of the charge is slowly raised to a maximum of 240° C. At first, refluxing of maleic acid and sublimation of maleic anhydride are observed, but after the temperature has been held at 240° C. for about 1 hour, a homogeneous, clear, dark solution is obtained with no apparent reflux or sublimation.

The charge is then cooled to about 120° C. and 424 g. (1.4 moles) of acid bodied CNSL (CNSL heated with $H_2SO_4$ as in U.S. Pat. No. 2,128,427 to a flow of 11 cm. and hence containing oligomers of the phenol of Formula I) is added. After mixing thoroughly and with the temperature at least 100° C., 104 g. (1.4 moles) of finely ground calcium hydroxide is added and the charge held at 120° C. for one hour with continuing stirring. During this heating period, the condenser is removed to allow evaporation of water formed by neutralization of the calcium hydroxide.

At this point, the product can be stored for future use or it can be converted to a friable resin by mixing quickly and thoroughly (while still at 80°-100° C.) with 75.5 g. of paraform pouring into suitable trays and curing for 16 hours at 175° C.

The resulting solid infusible resin is ground and sieved to yield material of 0.4 mm. diameter or less which is suitable for compounding into auto brake formulations.

EXAMPLE 2

To a 1-liter stainless steel Parr pressure apparatus equipped with a thermometer well, mechanical stirrer, and a pressure gauge are charged 300 g. (one mole) acid washed CNSL and 116 g. (one mole) maleic acid. The autoclave is closed and sealed, agitation started and the charge is heated slowly to 240° C. During heating, no pressure is observed on the pressure gauge until the temperature reaches about 210° C. Over the temperature interval 210°-240° C., the pressure increases to about 6.7 kg/cm². The charge is held at 240° C. for 1 hour, heating is discontinued, and the temperature allowed to drop to 80° C. When the temperature has dropped to about 80° C., the excess pressure (about 2.5 kg/cm²) is vented and the charge (clear, dark, homogeneous liquid) is discharged into a 1-liter resin flask. At this point, 300 g. (one mole) of acid bodied CNSL is added, the solution is mixed thoroughly and the temperature is raised to 100°-120° C. Calcium hydroxide (74 g., one mole) is added and the charge held at 120° C. for 1 hour.

The charge is cooled to about 80° C., mixed quickly with 53.5 g. (1.78 mole) paraform and then transferred into a flat aluminum pan. The resulting semi-solid mass is cured for 16 hours at 175° C. After grinding to about 0.4 mm. diameter or less, the product is ready for compounding into an auto brake formulation. It comprises a phenol-formaldehyde condensate of a phenol according to Formula II in which n is mostly 17 or 19, m is 2 or 4 and v is 1 or 3, all respectively, and low polymers thereof.

A curable novolak is readily prepared by reducing the amount of paraform in the above procedure from 1.78 to 0.8 to 1.2 moles. The ground product is curable by reaction with 0.6 to 1 mole of aldehyde in the form of hexamethylene tetramine under heat and pressure.

EXAMPLE 3

The Laboratory Test Brake Pad Formula is:

| Material | Parts by Weight |
| --- | --- |
| Asbestos fibers | 240 |
| BaSO$_4$ | 40 |
| Phenolic binder resin | 80 |
| Friction modifying particles | 40 |

The asbestos fibers (which are of the type conventionally used in brake pads) and other materials are combined and blended. A series of test formulations is prepared with various friction modifying particles. In each case, the binder resin is a conventional phenol-formaldehyde novolak with 1.4 mole ratio of phenol:-formaldehyde, ground to about 0.05 mm. size and blended with 7% by weight of hexamethylenetetramine.

A weighed quantity (150 g.) of the blend is placed in a mold densified at room temperature to give a preform for a disc brake friction component about 13.5 cm. × 5 cm. × 2 cm. The resulting preform is placed between platens at 150° C. and pressed for 15 minutes at 140 kg/cm$^2$. The molded disc, about 1.3 cm. thick, is post-cured for 16 hours at 175° C., then trimmed to test-piece dimensions by cutting and grinding.

The results of laboratory evaluation of a number of test formulations are summarized in Table I where "phenolic" refers to the resin constituting the friction modifying particle, %—CO$_2^-$ is the percent by weight of carboxyl groups in the resin, "base" is the polyvalent metal derivative used, "average" is the average coefficient of friction during the second fade sequence and "final" is the coefficient of friction at the end of the second fade sequence, "Max. Temp." is the maximum temperature reached at the end of the second fade sequence and "weight loss" is the loss in grams over the total test. Runs 1 and 2 are for comparison purposes with friction modifying particles of the invention shown in Runs 3–10 inclusive. Run 1 shows the use of a presently commercial friction modifying particle based on CNSL (available as NC104-40 from the 3M Co.). Run 2 shows the use of a particle prepared from formaldehyde-cured CNSL to which has been added 10% by weight of calcium oxide.

TABLE I

| Run | Phenolic | % —CO$_2^-$ | Base | Coefficient of Friction Avg. | Final | Max. Temp. | Weight Loss |
| --- | --- | --- | --- | --- | --- | --- | --- |
| 1 | Commercial | — | — | 0.36 | 0.18 | 415 | 0.36 |
| 2 | Unmodified | — | CaO | 0.37 | 0.19 | 425 | 0.37 |
| 3 | a | 4.7 | — | 0.45 | 0.47 | 480 | 2.6 |
| 4 | b | 4.7 | Ca(OH)$_2$ | 0.40 | 0.47 | 480 | 2.4 |
| 5 | c | 12.5 | Ca(OH)$_2$ | 0.37 | 0.38 | 480 | 1.4 |
| 6 | d | 12.5 | Al(OH)$_3$ | 0.36 | 0.42 | 480 | 1.7 |
| 7 | e | 0.8 | Ca(OH)$_2$ | 0.33 | 0.40 | 465 | 0.76 |
| 8 | e | 22 | Ca(OH)$_2$ | 0.34 | 0.40 | 480 | 1.7 |
| 9 | e | 34 | Ca(OH)$_2$ | 0.34 | 0.39 | 480 | 2.3 |

TABLE I-continued

| Run | Phenolic | % —CO$_2^-$ | Base | Coefficient of Friction Avg. | Final | Max. Temp. | Weight Loss |
| --- | --- | --- | --- | --- | --- | --- | --- |
| 10 | b | 12.5 | ZnCO$_3$ | 0.35 | 0.39 | 470 | 0.98 |

Footnotes for Table I
a. Prepared as in Example 1 except that vacuum distilled CNSL was used instead of acid washed and no base was used for neutralizaton. This product tends to include mostly simple phenols of Formula II.
b. Same as Run 3 except that lime was used for neutralization, to provide a calcium salt.
c. Prepared as in Example 1 with Ca(OH)$_2$.
d. Prepared as in Example 2, except neutralized with aluminum hydroxide.
e. Prepared as in Example 2 except neutralized with Ca(OH)$_2$.
f. Prepared as in Example 2.

Because these tests are designed to measure the characteristics, particularly the stability, of the friction particles at high temperature, the customary modifiers have not been used in the formulations. As a result, relatively high wear (weight loss) is encountered in those runs in which a high coefficient of friction is maintained to 480° C. Most of the wear occurs during the last 50° C. of the temperature rise. To provide a more realistic evaluation of overall properties, the same (or equivalent) particles are evaluated in a Car Test Formula which provides compositions similar to those used in making commercial disc brake pads.

| Material | Parts by Weight |
| --- | --- |
| Asbestos fibers | 462.4 |
| Aluminum oxide | 8.0 |
| Ferric oxide | 5.6 |
| Barium sulfate | 50.4 |
| Copper powder | 10.4 |
| Nitrile rubber (40% CH$_2$=CH—CN) | 24.0 |
| Phenolic binder resin | 125.6 |
| Friction modifying particles | 113.6 |

Mixing, forming and post-curing are as described previously.

Disc brake pads prepared from the above formulation are evaluated in a modified version of the car test described above. Generally all of the friction particles described in Table I, Runs 3–10 inclusive, provide satisfactory operation. As compared to pads comprising the commercial material of Run 1, the compositions of Runs 3–10 are compounded to brake pads which require line pressures which were equal or lower, and provide friction levels which were relatively constant before and after the high-speed stop sequence. Wear, as measured by thickness before and after the total sequence, is generally found to be somewhat higher for particles corresponding to Run 3 than for pads with the particles of Run 1. It is generally found to be equal or lower for pads using products of Runs 4–10 and was about 50% lower for the pads using particles of Run 5.

The desired friction and wear characteristics of brakes, clutches and similar high-friction components for passenger cars, trucks, railroad trains, off-the-road construction equipment, heavy machinery and the like vary greatly, and the optimum formulations for each use will vary accordingly, as is well known in the art. Generally, such a friction component will comprise 40–70% asbestos, 0–15% metallic oxide, 10–25% binder (including both phenolic resin and elastomeric plasticizing material) and 9–25% friction modifying particles. The size of the particles is not critical and for most purposes a wide range is at least as satisfactory as a narrow distribution. Generally, the particles pass sieves with meshes of about 0.20 to 0.85 mm. with not more than 10% passing 0.15 mm. sieves because the small sizes tend to be inefficient. Friction components are those components in a device whose surfaces contact a second surface, the two surfaces being in relative motion, for the purpose of effecting a reduction in the rate of relative motion.

What is claimed is:

1. A resinous condensation product of (1) the ene reaction adduct of dienophilic alpha-beta-unsaturated aliphatic carboxylic acid or anhydride or ester thereof with unsaturated cashew nut shell liquid phenol or oligomer thereof and (2) aldehyde.

2. The resinous condensation product of claim 1 wherein alpha-beta unsaturated acid or derivative is maleic acid or anhydride and aldehyde is formaldehyde.

3. As a composition of matter, a resinous condensation product of aldehyde and phenol wherein the phenol comprises meta(carboxy-alkenyl)substituted phenol of the formula:

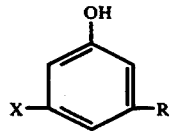

wherein R is a carboxy-alkenyl group containing at least one ethylenic double bond of the formula

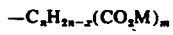

where $n$ is 17 to 21, $m$ is an integer from 1 to $y+1$, $x$ is an integer from 2 to 11 inclusive and is odd when $m$ is even and even when $m$ is odd, $x-m=y$, $y$ is 1, 3 or 5, M is H or one equivalent of a polyvalent metal and X is H or OH;

or an oligomer of said phenol.

4. The resinous composition of matter according to claim 3 wherein $n$ is 17, $m$ is 2 and $y$ is 1.

5. The resinous composition of matter according to claim 3 wherein $n$ is 19, $m$ is 4 and $y$ is 3.

6. A friction modifying particle comprising a fully cured condensation product of aldehyde and phenol wherein the phenol comprises meta-(carboxy-alkenyl)-substituted phenol of the formula:

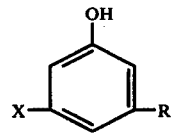

wherein R is a carboxy-alkenyl group containing at least one ethylenic double bond of the formula

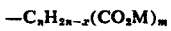

where $n$ is 17 to 21, $m$ is an integer from 1 to $y+1$, $x$ is an integer from 2 to 11 inclusive and is odd when $m$ is even and even when $m$ is odd, $x-m=y$, $y$ is 1, 3 or 5, M is H or one equivalent of a polyvalent metal and X is H or OH;

or an oligomer of said phenol.

7. A friction component comprising friction modifying particles according to claim 6.

* * * * *